United States Patent [19]

Hicks

[11] Patent Number: 4,497,131
[45] Date of Patent: Feb. 5, 1985

[54] SAFETY BAIT DISPENSER
[76] Inventor: Donald D. Hicks, Geraldine, Mont. 59446
[21] Appl. No.: 328,485
[22] Filed: Dec. 8, 1981
[51] Int. Cl.³ .............................................. A01M 1/20
[52] U.S. Cl. ...................................................... 43/131
[58] Field of Search ................................... 43/131, 121

[56] References Cited
U.S. PATENT DOCUMENTS

| | | | |
|---|---|---|---|
| 1,960,434 | 5/1934 | Thalheimer | 43/131 |
| 1,964,611 | 6/1934 | Watson | 43/131 |
| 2,837,861 | 6/1958 | Graham, Sr. | 43/131 |
| 3,427,743 | 2/1969 | Brunner | 43/131 |
| 3,978,607 | 9/1976 | Piere | 43/131 |
| 4,208,829 | 6/1980 | Manning | 43/131 |
| 4,211,028 | 7/1980 | Roberling | 43/131 |

FOREIGN PATENT DOCUMENTS

| | | | |
|---|---|---|---|
| 434861 | 10/1967 | Switzerland | 43/131 |
| 2023987 | 1/1980 | United Kingdom | 43/131 |

*Primary Examiner*—Nicholas P. Godici
*Assistant Examiner*—Richard K. Seidel
*Attorney, Agent, or Firm*—Bernhard Kreten; Leonard Bloom

[57] ABSTRACT

A bait dispenser for selectively dispensing poisonous bait to rodents and the like while preventing access to domestic livestock, pets and desirable wildlife consisting of a centrally located anchoring spike with a lower bait pan, a central spacer, and an upper cover pan overlying the bait pan in such a manner that access to the bait pan is specifically limited.

9 Claims, 2 Drawing Figures

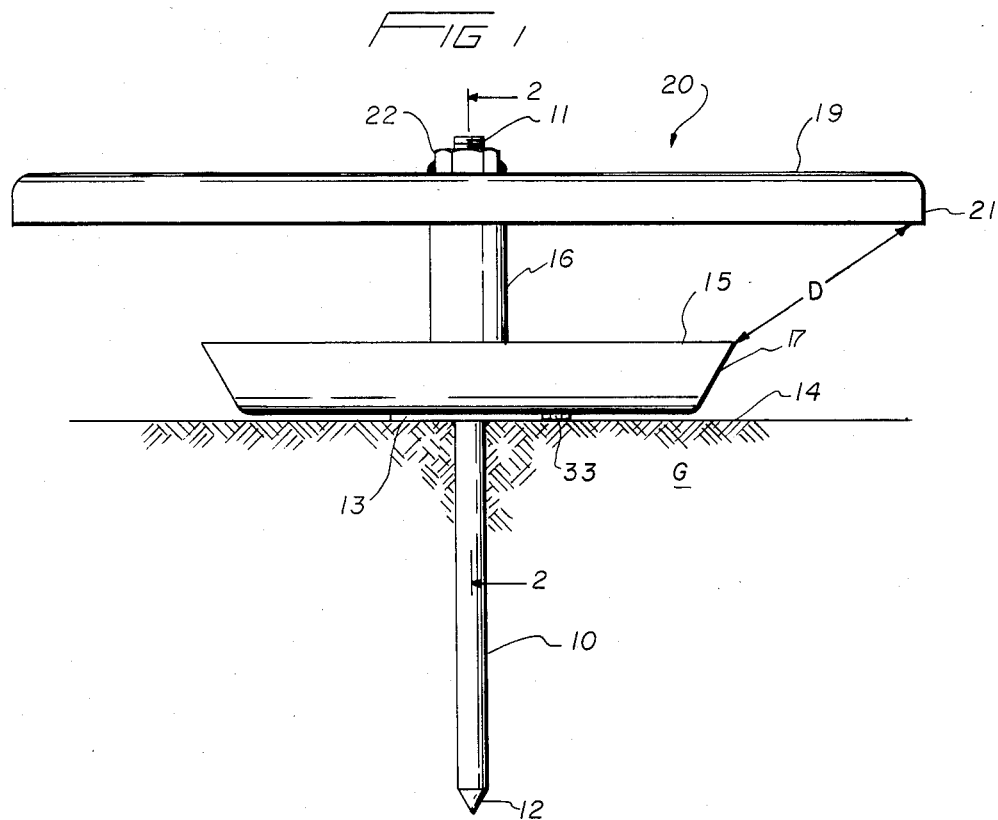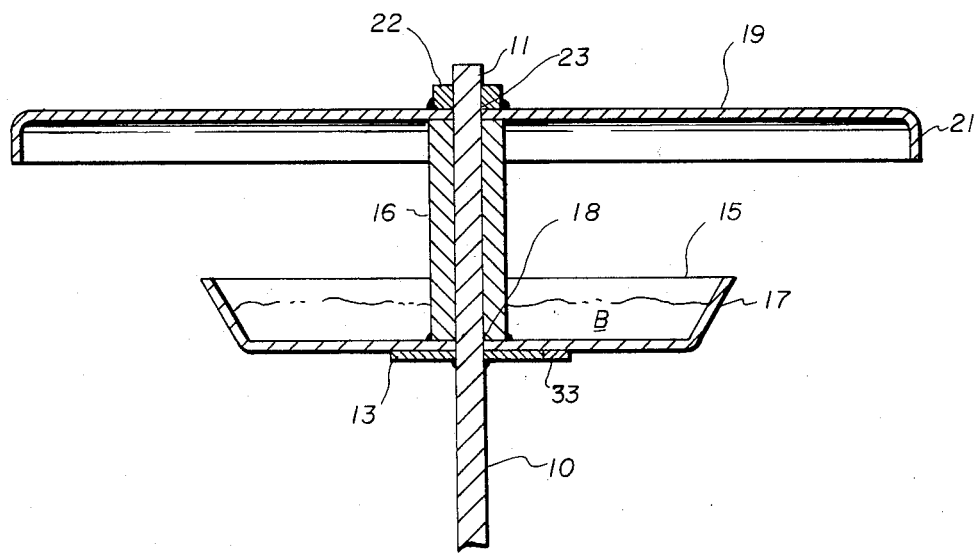

SAFETY BAIT DISPENSER

BACKGROUND OF THE INVENTION

This invention relates generally to an apparatus for selectively dispensing poisonous bait to rodents and the like.

The control of certain rodent populations has always been a significant consideration in livestock and wildlife areas. The problem is to dispense poisonous bait to certain populations and prevent ingestion of the same by desirable wildlife or domesticated livestock and pets. The bait is usually attractive to both desirable and undesirable populations, therefore access to the bait must be controlled and limited so that only target populations have a means of ingress. Thus, the exact configuration of a bait dispenser determines how effective it will be in selectively distributing poisonous bait.

Rodents have certain natural instincts which when understood can be applied to the structure of a bait dispenser. Mice, rats and ground squirrels or gophers have a natural tendency to hide underneath objects for protection, but feel most secure when also provided with a clear panoramic view so that they can detect the approach of any predators. Thus, the most effective bait dispenser is one that not only attracts the desired rodent by providing an easily accessible supply of highly desirable foodstuffs, but also allows the rodent to partake of the same in an atmosphere that is conducive to a feeling of security. Even if a rodent is attracted to a bait dispenser by the odor of the bait itself, the rodent may not approach the apparatus if the position appears to be one of vulnerability. The apparatus according to the instant invention presents a novel configuration which emphasizes a rodent's own natural instincts for protection during feeding.

The following patents reflect the state of the art of which applicant is aware in so far these patents appear to be germane to the patent process:

| | | |
|---|---|---|
| 1,960,464 | Thalheimer | May 29, 1934 |
| 1,964,611 | Watson | June 26, 1934 |
| 2,837,861 | Graham, Sr. | June 10, 1958 |
| 3,978,607 | Piere | Sept. 7, 1976 |
| 4,208,829 | Manning | June 24, 1980 |
| 4,211,028 | Roberling | July 8, 1980 |

Of these references, applicant believes Watson to be highly significant since he teaches the use of an exterminating device having a top cover, a base, and a central area for holding the bait.

Similarly, the patent to Piere is significant since he teaches the use of a snail snare having a disc located beneath a cover member, the cover member including an angular wall with a plurality of spaced openings permitting the snail to move beneath the cover and gain access to the poisoned bait. A spike passes through both the cover and the disc and penetrates the ground and tightly holds the cover upon the ground, a portion of the cover being deflectable to permit access of a bracket to an attaching means in order to effect removal of such when it is desired to move the snail snare from one location to another.

Also, the patent to Manning would appear to be significant in that access to a central portion is controlled by a plurality of apertures provided in the cover pan.

The three patents discussed in the above paragraphs have in common the use of a cover pan with a series of fenestrations to limit access to the bait pan. The apparatus according to the instant invention is distinguished in that the spatial relationship between the cover and the bait pan creates a configuration which limits access without the use of a series of fenestrations. This provides an advantage because rodents are cautious and will avoid entering spaces that appear threatening or confining because of the lack of a clear panoramic view of the surrounding area so that the existence of a predator or a trap can be easily detected, while simultaneously discouraging bait acceptance by a desirable population.

The remaining references show the state of the art further.

OBJECTS AND SUMMARY OF THE INVENTION

A primary object of this invention is to provide a novel apparatus for dispensing poisonous bait to rodents which selectively limits access only to the desired population thereby preventing the poisoning of domesticated animals, desirable wildlife or pets.

Another object of this invention is to provide a novel apparatus for dispensing poisonous bait to rodents which is securely fastened to the ground so that it cannot be inadvertently tipped over thereby dispensing poisons to populations other than the target population and to the environment.

A further object of this invention is to provide a novel apparatus for dispensing poisonous bait to rodents which provides easy means of ingress and egress so that the rodents will be attracted to and enter the dispenser without fear of capture which may deter initial entry.

A still further object of the present invention is to provide a dispenser for poisonous bait for rodents which protects the bait from the natural elements.

Still another object of the present invention is to provide a dispenser for poisonous bait for rodents which is easy to install and service, simple to use, and lends itself well to mass production techniques.

Other objects and advantages of the invention will become apparent when viewed in the light of the following description in conjunction with the accompanying drawings.

BRIEF DESCRIPTION OF THE DRAWINGS

FIG. 1 is side view of the device as it would appear installed in the ground.

FIG. 2 is a side sectional view along lines 2—2 in FIG. 1.

BRIEF DESCRIPTION OF THE PREFERRED EMBODIMENT

Referring now to the drawings in detail wherein like references numerals refer to like parts throughout the several figures, reference numeral 10 refers to a central spike which is threaded at a top extremity 11, pointed at a lowest extremity 12 and has a flat, square washer 13 welded to the spike 10 at a distance approximately five inches from the top of the spike.

The spike 10 is installed in the ground by placing a piece of one inch pipe over the top of the spike which rests on the washer 13 and hammering on the pipe to drive the spike in to the ground G FIG. 1 thus preventing any damage to the threads 11. The spike 10 may be driven into the ground until the washer 13 contacts the top surface 14 of the ground G. Alternatively, the spike 10 may be driven less than all the way into the ground so that the bait dispenser generally referred to by reference numeral 20, may be adjusted to any desired height.

Once the central spike 10 is installed, a bait pan 15 and a central spacer 16 are slidably disposed over the spike 10 and come to rest on the square, flat washer 13 which is fixed to the spike 10. The bait pan 15 is formed substantially like a metal plate with an upwardly and outwardly slanted peripheral lip 17 approximately one inch high. The central spacer 16 is permanently affixed by means of a weld or the like over a centrally disposed aperture 18 (FIG. 2) in the bait pan 15. The bait B is placed in the bait pan 15 as shown in FIG. 2.

The cover pan 19 is also a circular metal plate and is provided with a straight depending peripheral lip 21, a nut 22 is permanently affixed to the top of the cover pan 19 by means of a weld or the like over a centrally disposed aperture 23 (FIG. 2) so that the cover 19 and its associated nut 22 can engage the thread 11 on the spike 10 and be screwed down upon the spacer 16. A stop peg 33, which may be a nut welded to the bottom of the bait pan 15, is provided on the bottom of the bait pan 15 in such a position that it engages the corner of the square washer 13 providing a stop mechanism for preventing rotation of the spike 10 when the lid 19 is firmly installed on the threads 11. This provides for easy installation and disassembly because a grip on the bait pan 15 provides a purchase against spike rotation which allows for easy installation and removal of the lid 19 so that the bait pan 15 can be readily serviced. When the bait pan 15 is held firmly and the cover 19 rotated tightly down, the unit will rotate in the ground if rubbed against rather than unscrewing the cover 19. Only by holding the bait pan 15 will the cover 19 then unscrew. This is an important part of making the dispenser 20 hard for livestock and wildlife to get into, yet easy for human access.

In operation, the spike 10 is driven into the ground to the desired depth then the bait pan 15 is installed with the appropriate bait B, then the cover 19 is tightly screwed onto the threads 11 on the spike 10 so that it is brought in firm registry with the spacer 16. The distance D (FIG. 1) limits the size of the animal that can enter the dispenser. A two to one ratio is maintained beetween the radius of the bait pan 15 and the radius of the cover 19 so that a rodent that gains access is underneath the overhang of the cover 19 and thereby feels more secure from airborne predators. The absence of any visual obstructions except the narrow center spacer 16 allows the rodent a clear field of vision thereby alleviating any suspicions of entrapment or the unnoticed approach of a predator. This is particularly significant to the Richardson ground squirrel or gopher because all suspicions must be dispelled before feeding takes place to any great extent.

The central spacer 16 can be varied in length to adjust the distance D (FIG. 1) which limits the size of the rodent that can access the bait pan 15. Thus the dispenser can be adjusted to accommodate different sized rodents.

Having thus described the preferred embodiment of the invention, it should be understood that numerous structural modifications and adaptations may be resorted to without departing from the spirit of the invention.

What is claimed is:

1. An apparatus for safely dispensing poisonous bait or the like comprising in combination:
a centrally disposed anchoring spike around which is disposed a lower bait pan, and an upper cover pan, a spacer therebetween providing a peripheral open area wherein said bait pan has an upwardly and outwardly extending peripheral lip and wherein said cover pan has a vertically downwardly depending peripheral lip wherein said bait pan has a stop means affixed to a bottom surface thereof in a location to abut against a flat washer affixed to said spike whereby said cover pan can only be removed from said spike when said bait pan is still in the ground by grasping said bait pan and rotating said cover pan.

2. The device of claim 1 wherein said spike is threaded at an upper extremity, pointed at a lower extremity and has affixed to it a square flat washer disposed below said lower bait pan.

3. The device of claim 1 wherein said cover pan has a centrally disposed aperture with a nut affixed in registry with said aperture on a top surface thereof to engage said threads on said spike.

4. The device of claim 3 wherein said bait pan has affixed to it in a central location said spacer around an aperture in the center of said bait pan which receives said spikes.

5. The device of claim 1 wherein said cover pan is substantially twice the radius of said bait pan whereby animals feeding from said bait pan are under an overhang of said cover pan.

6. The device of claim 5 wherein said cover pan is variably spaced from said bait pan by said spacer to provide limited access to said bait pan.

7. The device of claim 6 wherein said apparatus is formed from metal.

8. The device of claim 7 wherein said stop means is a nut.

9. The device of claim 8 wherein said bait pan lip is approximately one inch high.

* * * * *